United States Patent [19]

Hirai

[11] Patent Number: 4,505,463
[45] Date of Patent: Mar. 19, 1985

[54] JIG APPARATUS FOR USE WITH INDUSTRIAL ROBOTS

[75] Inventor: Seiji Hirai, Kawai, Japan

[73] Assignee: Kabushiki Kaisha Hirai Tekkosho, Osaka, Japan

[21] Appl. No.: 514,233

[22] Filed: Jul. 15, 1983

[30] Foreign Application Priority Data

Jul. 15, 1982 [JP] Japan ............................ 57-108679[U]
May 16, 1983 [JP] Japan ................... 58-86471

[51] Int. Cl.³ ............................................. B23Q 1/04
[52] U.S. Cl. ....................................... 269/56; 269/13; 269/58; 269/309
[58] Field of Search ..................... 269/56, 13, 58, 309; 403/338, 335, 336, 349; 198/648

[56] References Cited

U.S. PATENT DOCUMENTS 1,484,216  2/1924  Hekking ............................. 403/338
3,927,760 12/1975  McCall ............................... 198/648
4,444,541  4/1984  Bergman ............................. 269/309

Primary Examiner—Robert C. Watson
Attorney, Agent, or Firm—Armstrong, Nikaido, Marmelstein & Kubovcik

[57] ABSTRACT

The present invention relates to a jig apparatus for use with industrial robots, designed so that in processing work on a multikind and small- and medium-quantity production basis, when work to be automatically welded, soldered, painted or press-worked is changed from one type to another, a jig table for clamping the work can be efficiently removably exchangeably mounted. To this end, the technical arrangement of the invention comprises a jig table for clamping work, and a slide disk adapted to be slid back and forth on guide rails laid on an installation stand placed on a workshop floor to carry in and out of work with respect to a welding, soldering, press-working or other industrial robot, wherein in order to removably assemble the jig table from above to the slide disk so that they can be integrally moved back and forth, a pawl disk fixed to the upper surface of the slide table and a second pawl disk fixed to the lower surface of the table in opposed relation to the first pawl disk are removably engaged with each other by means of turnable hook segments fitted on the outer peripheral surfaces of the two pawl disks, while a centering guide post fixedly erected on the center of the pawl disk on the slide disk is removably fitted in the central opening in the pawl disk on the table through point contact between balls in a ball retainer fitted on the guide post and a centering guide bushing fitted in the central opening, the ball retainer being constantly subjected to an upward resilient force.

1 Claim, 25 Drawing Figures

JIG APPARATUS FOR USE WITH INDUSTRIAL ROBOTS

BACKGROUND OF THE INVENTION

In recent years, welding, painting and other industrial robots have come into wide use, and various operations such as welding, painting and press-work have been performed by the automatic mechanical power of robots. To take welding, which is typical of such operations, as an example, when an exclusive welding robot suitable for processing certain particular work is introduced to perform few-kind and large-quantity production, a welding jig apparatus must be used to carry in and out work with respect to the robot fixedly installed on the workshop floor and in this case the employment of such a jig apparatus of special construction and function adapted for exclusive use applicable to few kinds of work will suffice for the purpose, whereby operating efficiency can be increased; even if said jig apparatus is custom-made and hence rather expensive, it will pay because of mass production.

However, small and medium-sized enterprises receiving orders from large enterprises which manufacture large-sized products on a mass production basis have often to produce many kinds of assembly parts in small or medium quantities to comply with frequent model changes of large-sized products and to weld parts of complicated welding line in such a manner as not to spil their external appearance. For such rquirements, it would be obviously disadvantageous from the standpoint of operating efficiency and payability to introduce the aforesaid exclusive welding robot and said jig apparatus as its peripheral equipment. Therein lies the practical reason for the need to introduce a versatile welding robot, but the working efficiency of such versatile welding robot is not yet very high. Even if such robot itself has excellent versatility, unless the jig apparatus used to carry in and out work with respect to the robot is lacking in the versatility to comply with a large variety of changes in the kind of work, the result would be the same, since it is still impossible to increase working efficiency. Further, such jig apparatus must be inexpensive so that even small and medium-sized enterprises can afford to introduce it, and must be easy to use so that anyone can master it without being required to have expert technical knowledge. With these various conditions taken into consideration, the present situation is that it is difficult for small and medium-sized enterprises to find an optimum jig apparatus. It seems that similar problems may be said of the fields of painting, slodering, fusion cutting and press work, apart from the aforesaid welding operation.

SUMMARY OF THE INVENTION

The present invention provides a jig apparatus for use with industrial robots which meets such requirements, and accordingly its object is to provide an arrangement wherein on a slide disk which is adapted to be driven to slide back and forth on an installation stand installed on a workshop floor and which automatically carries in and out work with respect to an industrial robot fixedly installed on the workshop floor, anyone can removably and exchangeably mount a work clamping jig table efficiently, so to speak, in an at-a-touch mode operation, and nevertheless, once it is mounted there are obtained a reliable and stable fixed or locked state of the jig table relative to the slide disk and high centering positional accuracy, and the mechanism necessary therefor is very simple and a mass production effect can be expected to a great extent. Other secondary objects will become apparent from the following detailed description of a preferred embodiment of the invention.

BRIEF DESCRIPTION OF THE DRAWINGS

The drawings illustrate the present invention embodied in a welding jig apparatus for carrying in and out work with respect to a welding robot.

FIGS. 2–4 each show the work carrying-out state (the return state of the slide disk) with respect to the robot.

FIG. 5 is a side view, partly broken away, corresponding to FIG. 2, and

FIG. 6 is a plan view, partly broken away, corresponding to FIG. 3.

FIG. 7 is a side view, partly broken away, corresponding to FIG. 2, and

FIG. 8 is a front view corresponding to FIG. 4.

FIG. 12 is a fragmentary half-sectional view showing the locked state of the table.

FIGS. 13–15 are sectional views taken along the lines 13—13, 14—14, and 15—15 in FIG. 12, respectively.

FIG. 16 is a sectional view corresponding to FIG. 14, showing the unlocked state of the same.

FIG. 17 is a fragmentary half-sectional view taken along the line 17—17 in FIG. 16.

FIG. 18 is an enlarged perspective view of a hook segment.

FIG. 19 is a fragmentary half-sectional view, corresponding to FIG. 12, showing the removed state of the table.

FIG. 20 is a plan view of a pawl disk on the slide disk after removal.

FIG. 21 is a bottom view of a pawl disk on the table.

DETAILED DESCRIPTION OF THE PREFERRED EMBODIMENTS

Figure 1:
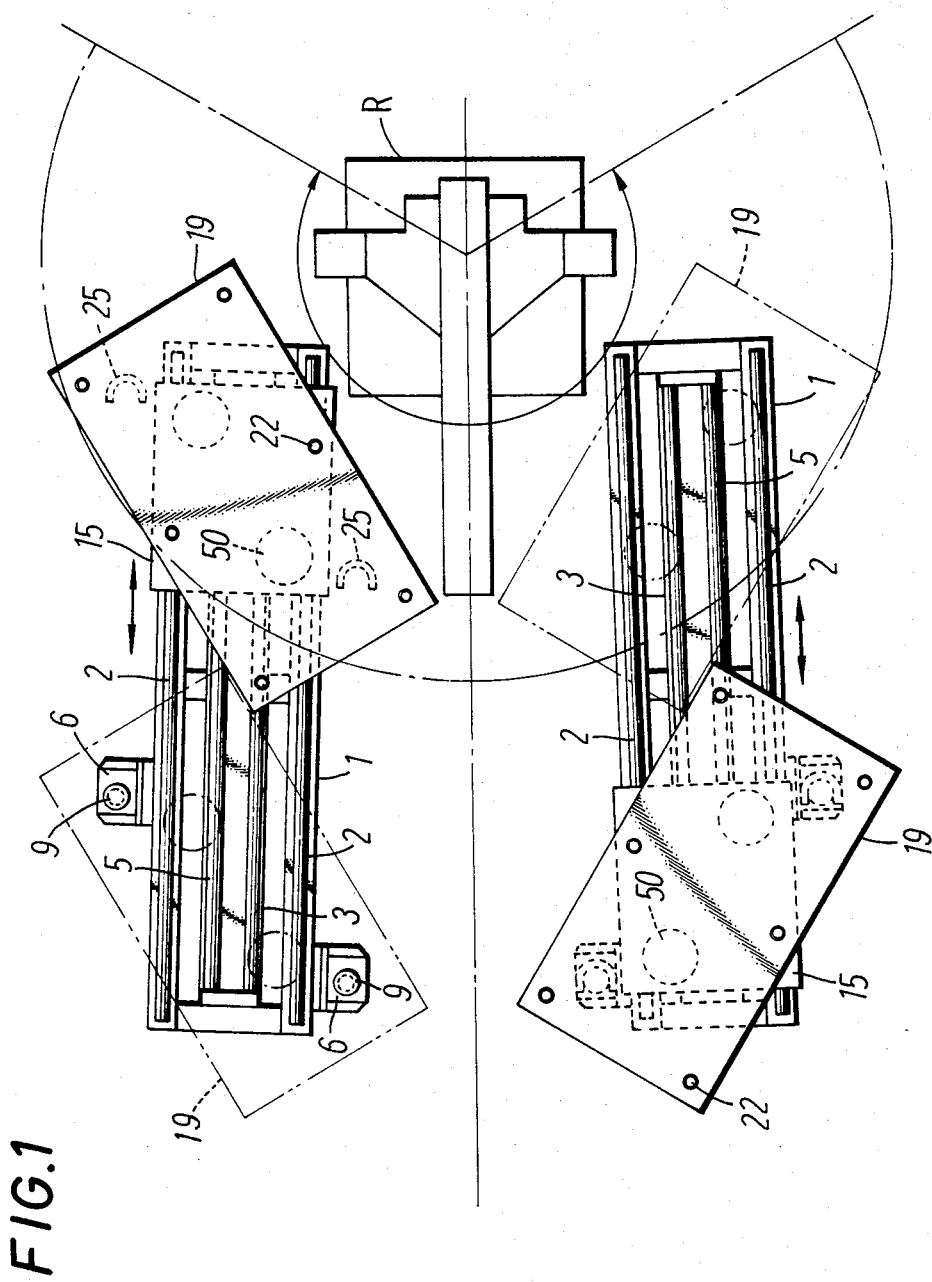
FIG. 1 is a complete schematic plan view showing a working layout of the jig apparatuses.

The arrangement of the present invention will now be described in detail with reference to illustrated embodiments thereof. The drawings show a versatile robot for arc welding as a typical example of an industrial robot, and the present invention is applied to a welding jig apparatus as peripheral equipment therefor. In FIGS. 1–11, the numeral 1 denotes an installation stand placed on a workshop floor, which is fabricated of square bars of metal into a rectangular parallelpiped which is rigid. The numeral 2 denotes a pair of slide guide rails laid on the upper surface of the stand 1 and extending parallel to each other longitudinally of the stand. The numeral 3 denotes a slide drive unit integrally assembled to the stand 1 between the rails 2 and adapted to drive a work transfer slide disk, to be later described, to slide back and forth along the rails 2 so as to carry work on a jig table into and out of the working area of a welding robot R. In this connection, the drive unit 3, though not shown in detail, is of the slide cylinder type using a differential piston type actuator as a drive source therefor, wherein its attachment base 4 is moved back and forth in a straight line under air pressure along a pair of guide shafts 5 by a chain. However, so long as said back-and-forth slide movement can be effected, the pneumatic motor may be replaced by a hydraulic motor, electric motor or other drive means.

Figure 2:
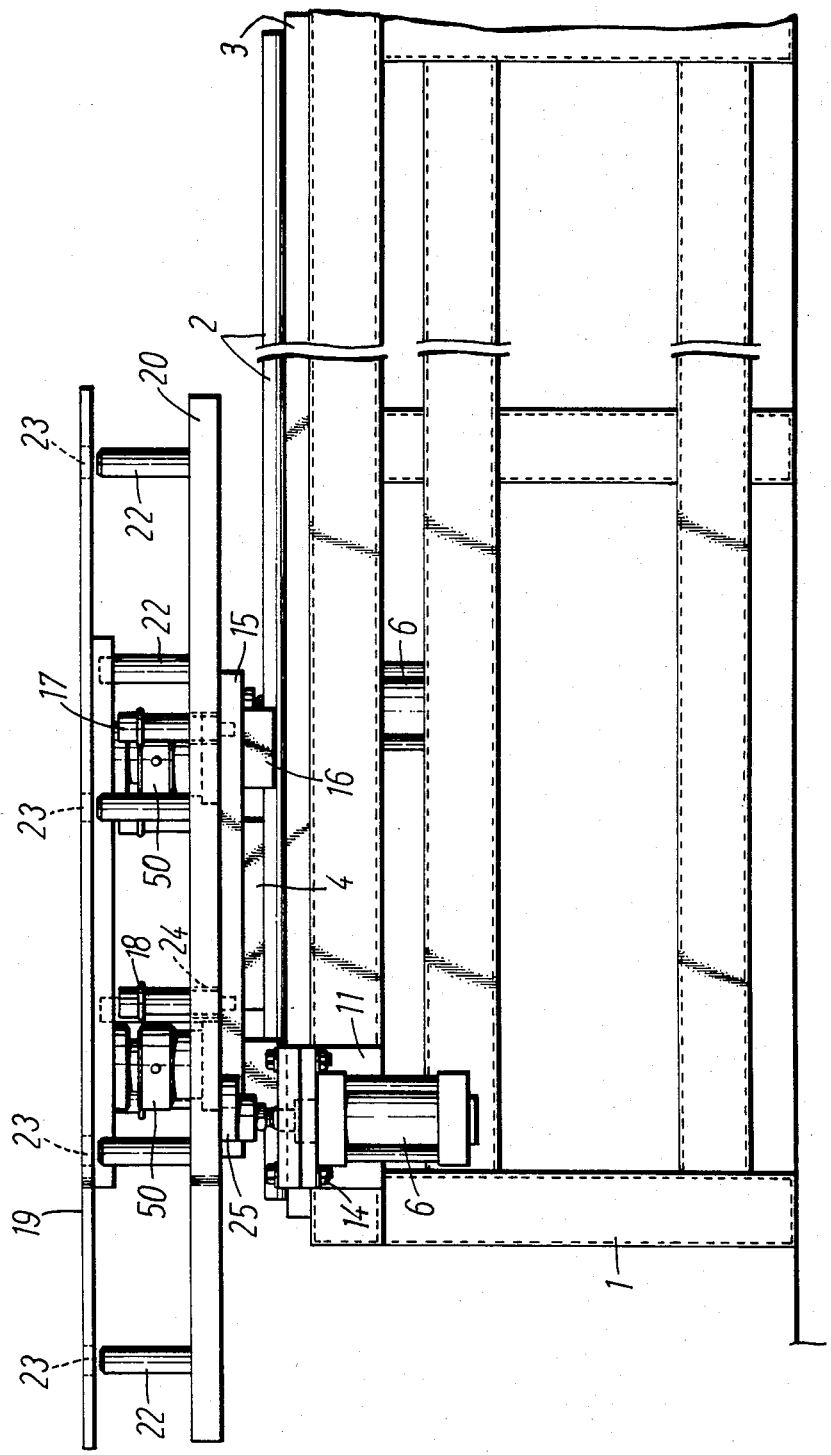
FIG. 2 is a side view, partly broken away, of the apparatus.
Figure 3:
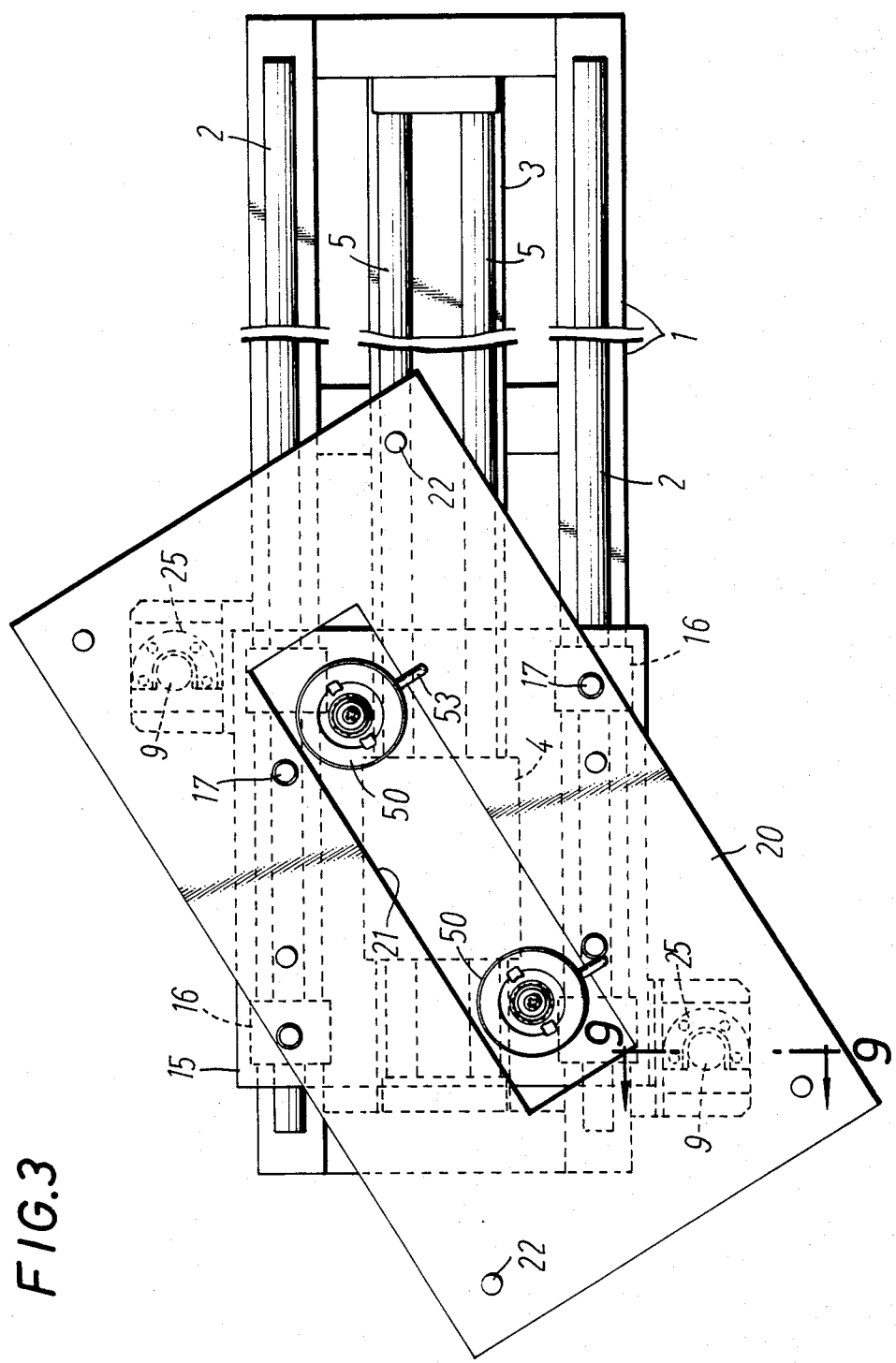
FIG. 3 is a plan view, partly broken away, of the apparatus shown with its jig table removed.
Figure 4:
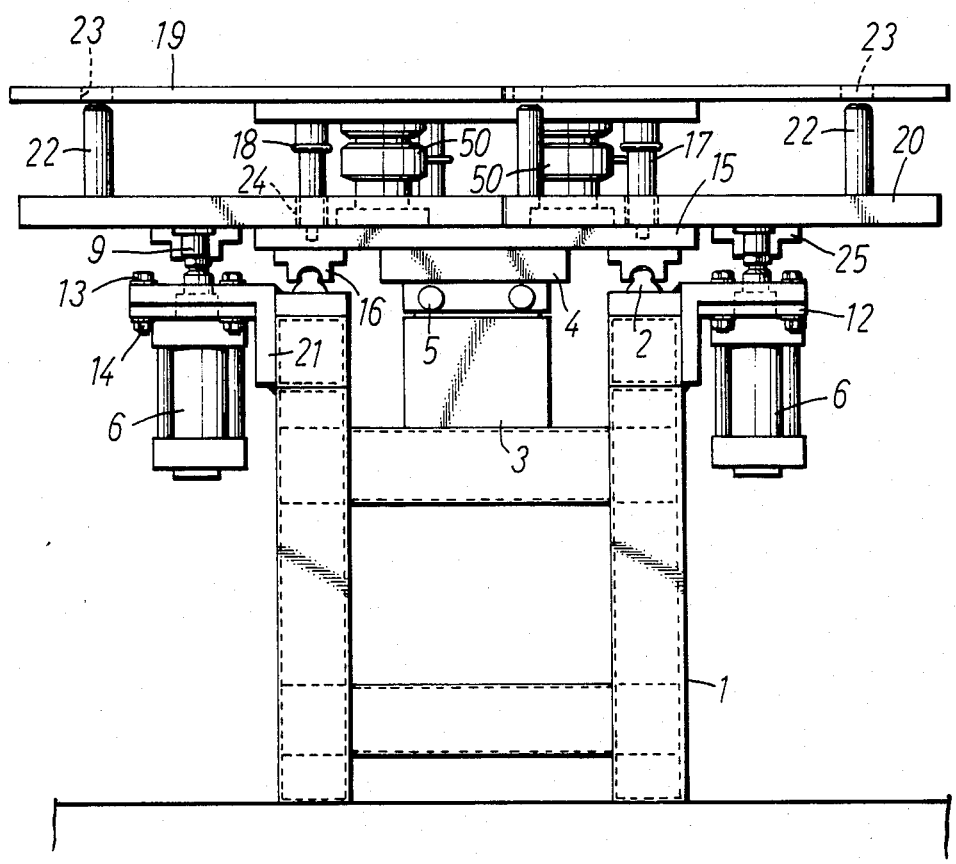
FIG. 4 is a front view of FIG. 2.

The numeral 6 denotes a pair of air cylinders installed at one longitudinal end of the stand 1 (the rear end serving as the work carrying out position), each air cylinder having an upwardly extending piston rod 7 whose threaded front end has threadedly fitted thereon a cap sleeve 9 having a stop flange 8 and fixed in position by a lock nut 10. By turning the nut 10, it is possible to adjust the attached level of the cap sleeve 9 relative to the threaded front end. When welded work is carried out of the welding robot R by the rearward returning movement of the slide disk and jig table, as shown in FIGS. 2 and 3, the air cylinders 6 function to push up a lifting disk to be later described (see FIGS. 7–9); thus, said air cylinders 6 may be replaced by hydraulic cylinders or other lifting means, so long as they are capable of performing such action.

In this connection, in the figures, angle bar stays 11 are welded to opposed lateral surfaces of the installation stand 1, and the attachment flanges 12 of the air cylinders 6 are abutted against said stays 11 and fixed thereto by a plurality of bolts 13 and nuts 14. However, the attaching and fixing means is not limited thereto. Further, the pair of cylinders 6, in relation to the plane configuration of the slide disk, lifting disk and jig table, are fixed to the stand 1 so that they are arranged on a diagonal of the substantially square slide disk to be opposed to each other (see FIGS. 3 and 6). However, it goes without saying that they are not limited to such disposition.

The work transfer slide disk 15 is fixed on the attachment base 4 of said drive unit 3 so that it moves back and forth integrally with the base 4; it is substantially square as viewed in a plan view. The numeral 16 denotes a plurality of rail receivers fixed on the lower surface of the slide disk 15 and, as is clear from FIGS. 4 and 8, having a recessed configuration whereby they are slidably fitted on the rails 2 on the stand 1. The numeral 17 denotes a plurality of lifting guide pins erected on the upper surface of the slide disk 15 and having stop flanges 18 disposed adjacent their heads, thereby defining the limit of lifting of the lifting disk to be later described. In the figures, the guide pins 17 are threadedly inserted into the slide disk 15 from above and fixed thereto, but other attaching and fixing means may be employed.

The numeral 19 denotes the jig table, which may be called a jig pallet, adapted to be removably and exchangeably mounted on the slide disk 15. Although its details are omitted from illustration, it is provided in advance with welding jigs suited for the work, so that the work is removably set or clamped by the jigs. In the present invention, various jig tables with welding jigs which match the various configurations of work have been prepared because of multikind small- and medium-quantity production. Such jig table 19 will be interchangeably attached to the slide disk 15 by a mounting and dismouting mechanism to be later described and will be presented for automatic welding of work.

The lifting disk 20 is placed in a clearance between the slide disk 15 and the jig table 19 and is formed with a clearing opening 21 at its middle (see FIGS. 3 and 6) so that it can be smoothly lifted and lowered without interfering with the mounting and dismounting mechanism for the table 19. The numeral 22 denotes a plurality of eject pins erected on the upper surface of the lifting disk 20 and opposed to pin receiving holes 23 formed in the jig table 19. Thus, as is clear from FIGS. 7–9, with the upward movement of the lifting disk 20, the eject pins 22 pass through the jig table 19 to push up the welded work a little from the welding jigs to facilitate the removal thereof. The eject pins 22 are removably inserted into recesses formed in the upper surface of the lifting disk 20 so that they can be exchanged or inserted into other recesses. The number and arrangement of such eject pins 22 and pin receiving holes 23 may be suitably determined according to the type of work. The numeral 24 denotes a plurality of guide pin receiving holes formed in the lifting disk 20 to receive said lifting guide pins 17 on the slide disk 15 to guide the lifting disk 20 for smooth upward and downward movements. Since the lifting disk 20 is assembled to the slide disk 15 through such engagement between the guide pins 17 and the receiving holes 24, it can also be moved back and forth integrally with the slide disk 15.

Figure 7:
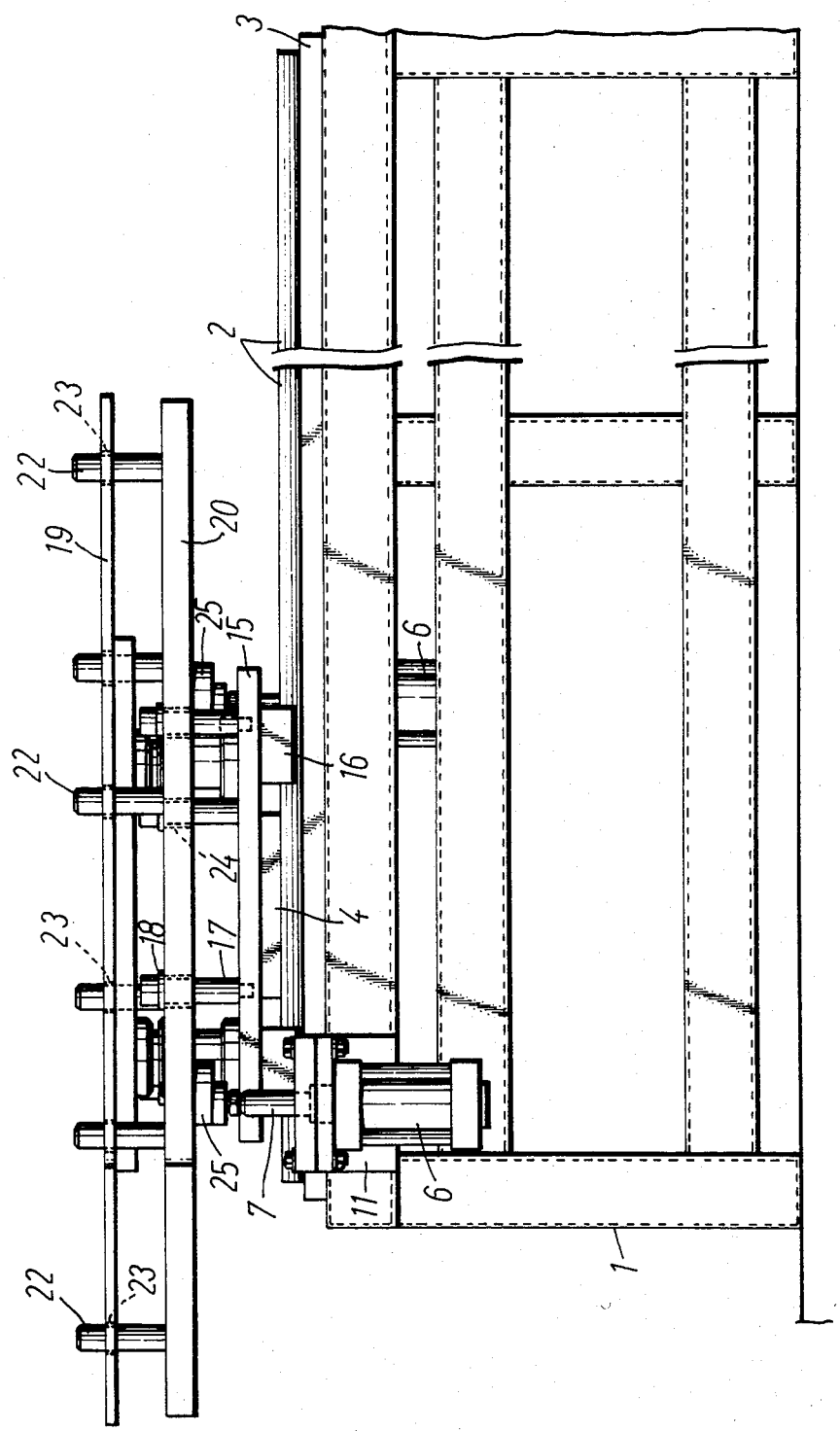
FIGS. 7 and 8 show the lifted state of a lifting disk.
Figure 8:
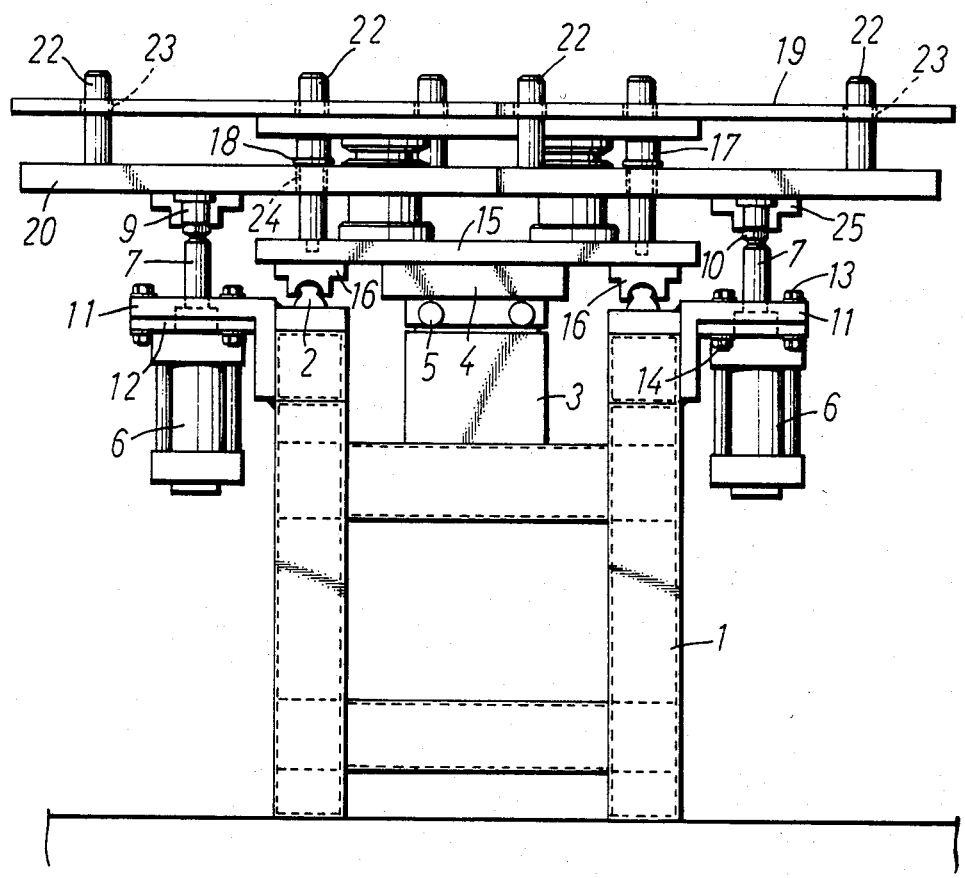
Figure 9:
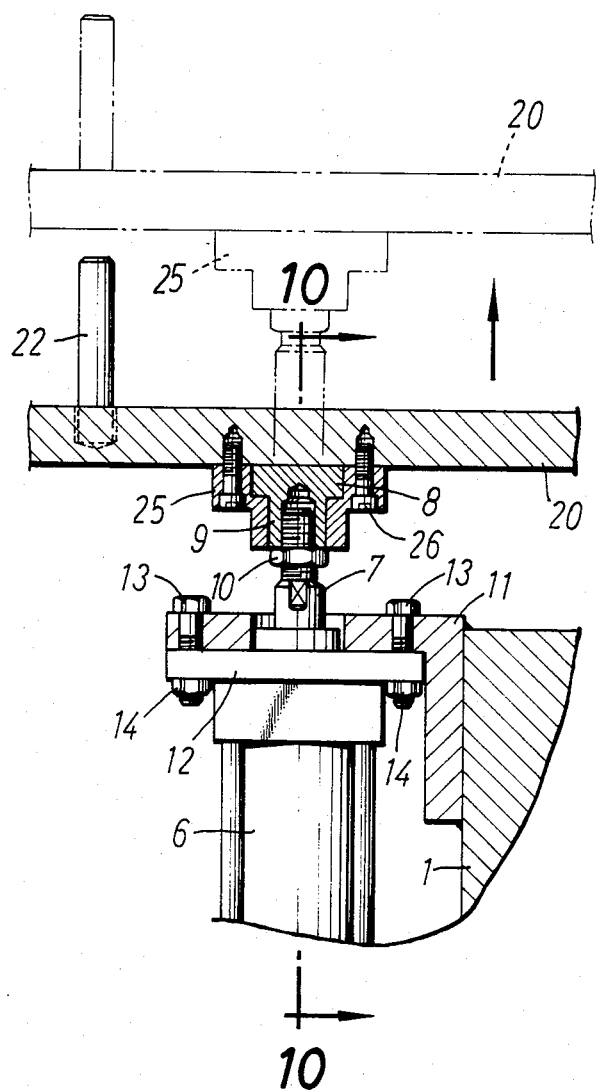
FIG. 9 is a fragmentary enlarged sectional view taken along the line 9—9 in FIG. 3.
Figure 11:
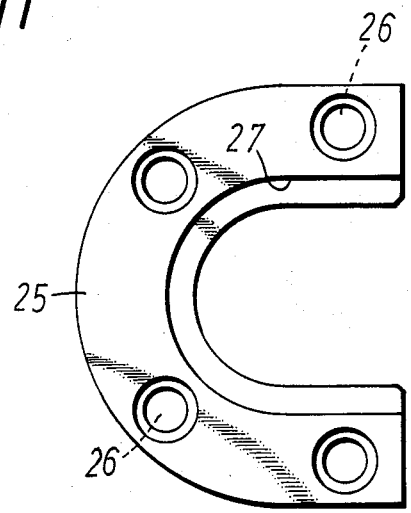
FIG. 11 is an enlarged bottom view of a positioning stop for the lifting disk.
Figure 10:
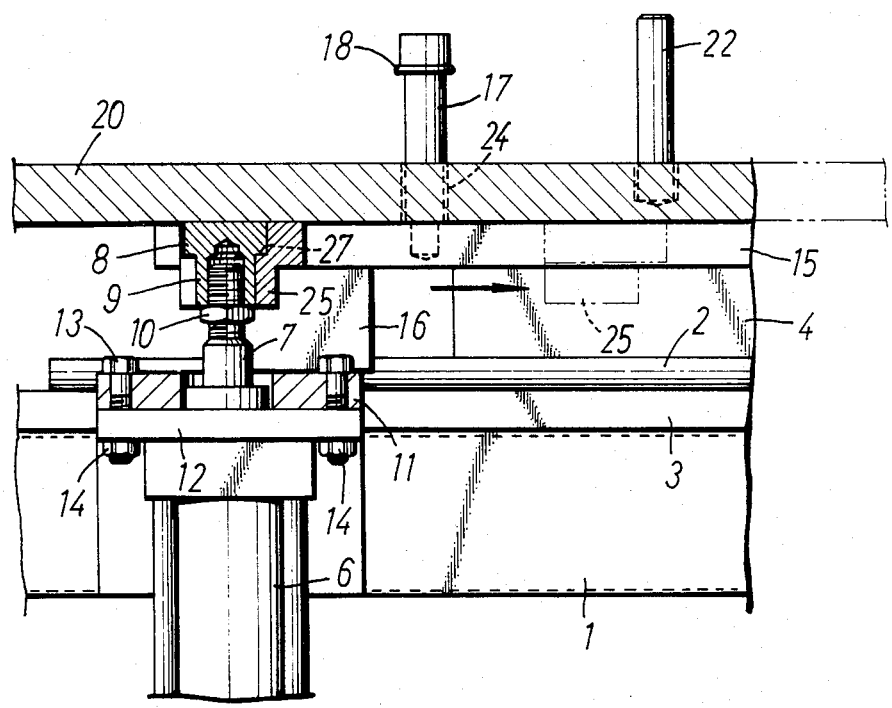
FIG. 10 is a sectional view taken along the line 10—10 in FIG. 9.
Figure 12:
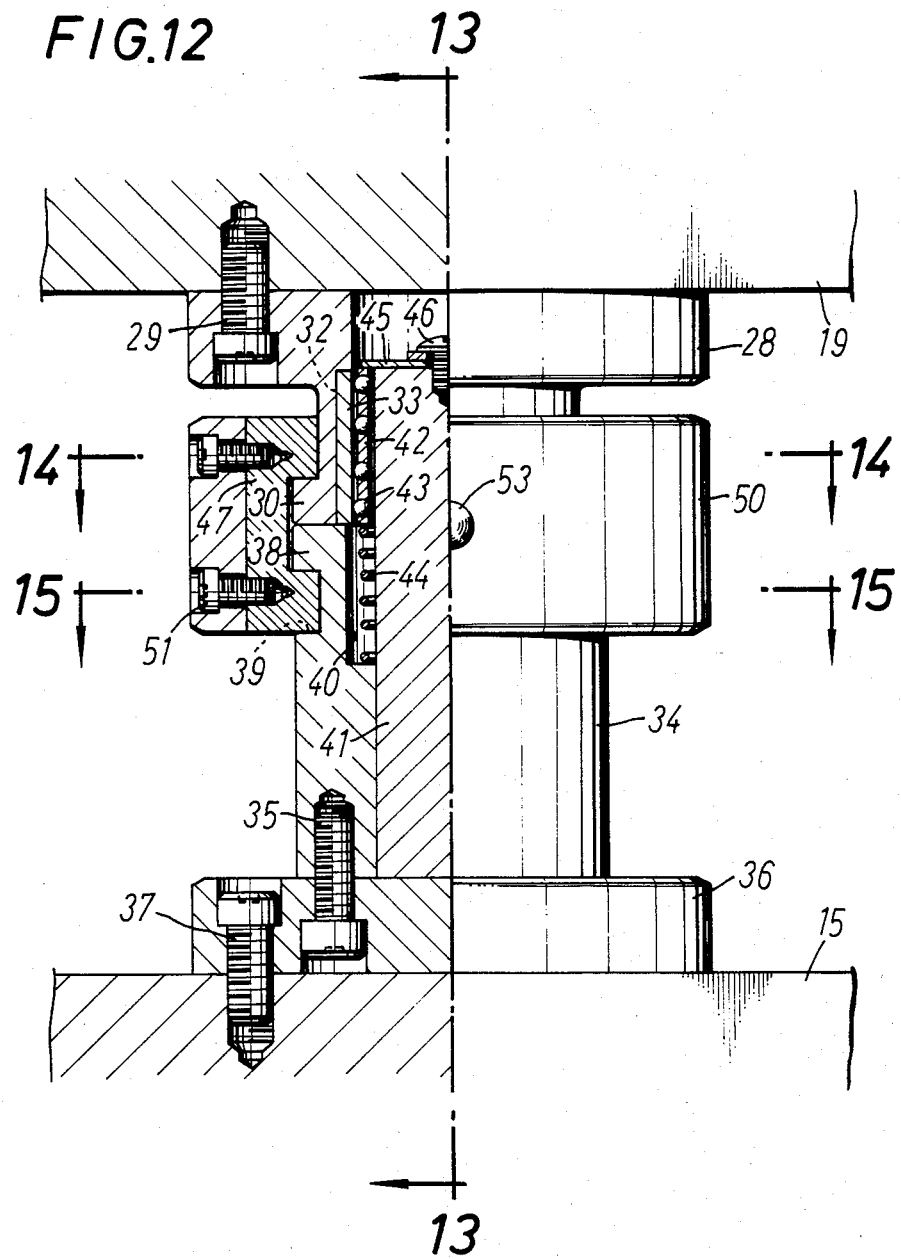
FIGS. 12–21 show a jig table mounting and dismounting mechanism on an enlarged scale.
Figure 13:
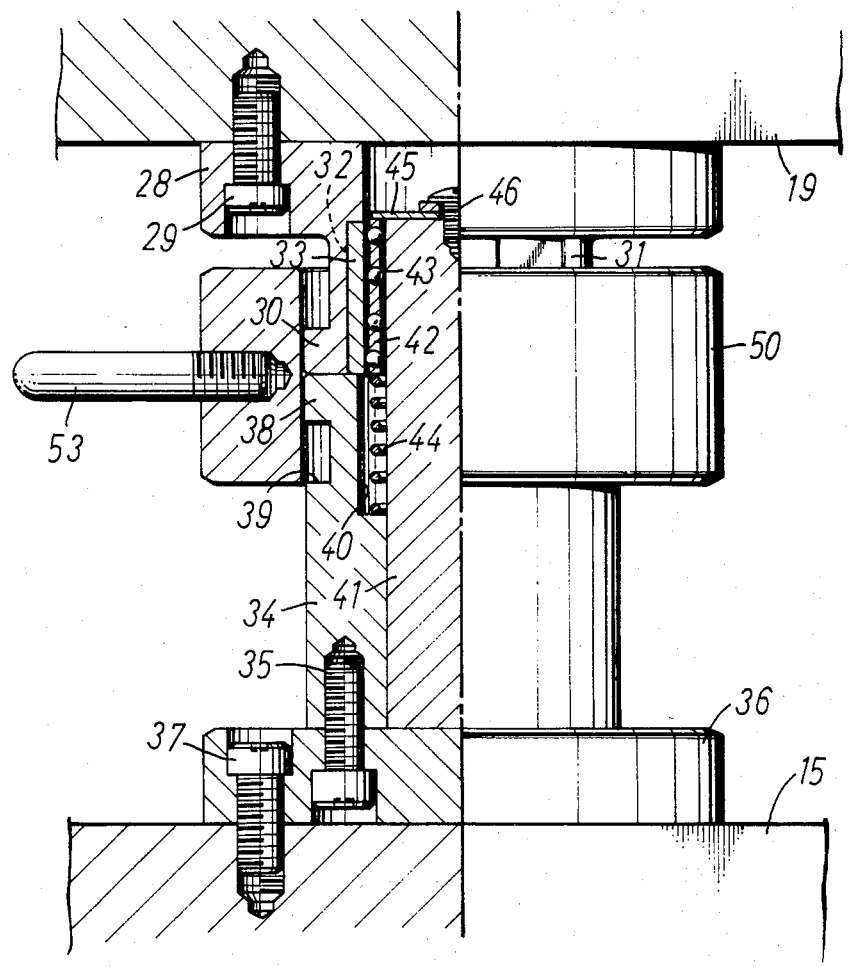

The numeral 25 denotes a pair of positioning stops fixed to the lower surface of the lifting disk 20 and associated with the aforesaid air cylinders 6 on the installation stand 1 so that, as is clear from FIGS. 9 and 10, they can be removably engaged with the cap sleeves 9 of the piston rods 7. That is, when the jig table 19 carries out the work with respect to the welding robot R, as shown in FIGS. 2 and 3, the stops 25 engage with the cap sleeves 9 to stop the lifting disk 20 at a predetermined position, where the air cylinders 6 are actuated to lift the lifting disk 20, as shown in FIGS. 7–9, whereby the eject pins 22 push the welded work from the jigs on the table 19.

Figure 5:
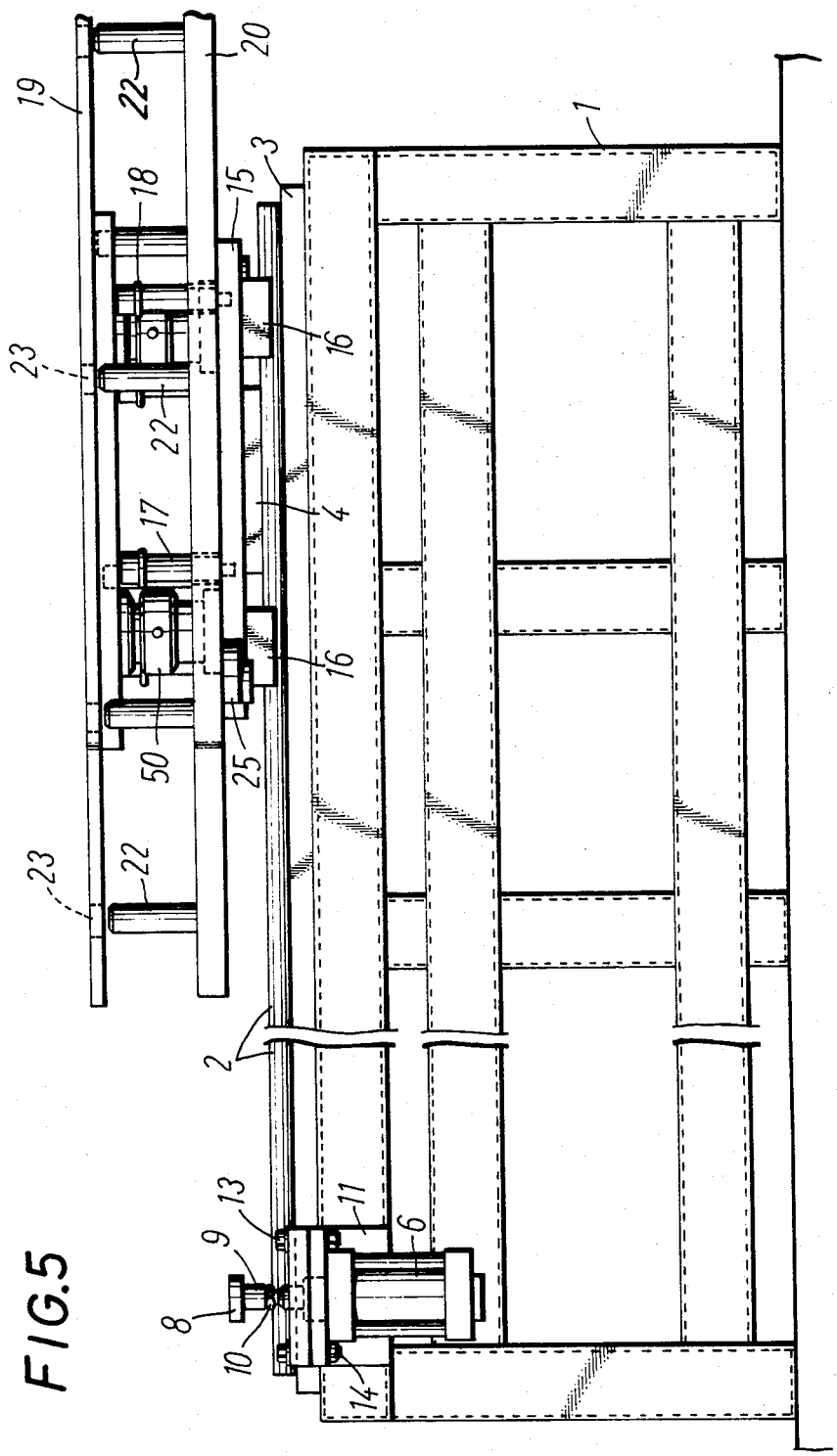
FIGS. 5 and 6 show the work carrying-in state (the going state of the slide disk).
Figure 6:
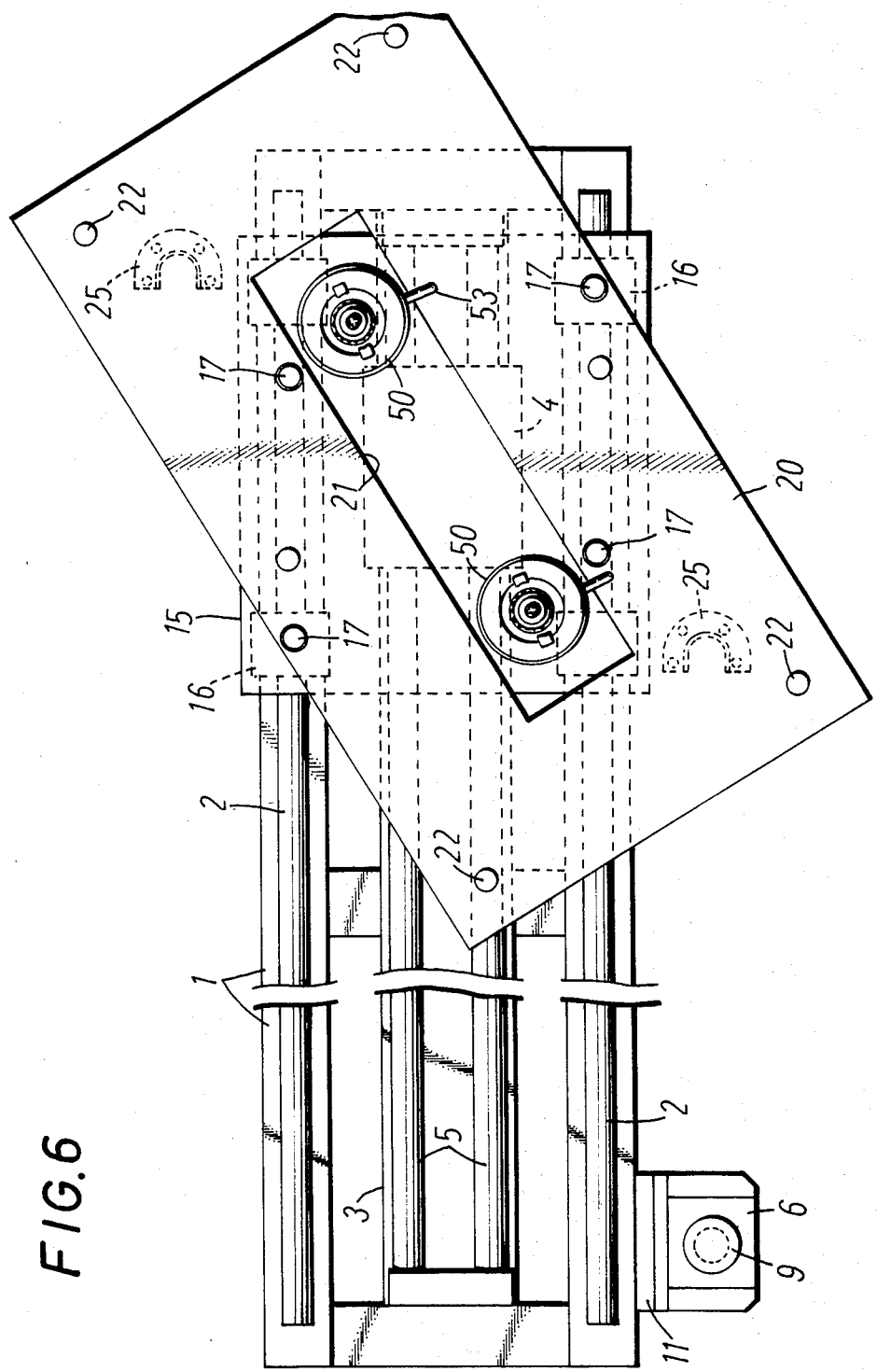

Reversely, when work is to be carried to the welding robot R, as shown in FIGS. 5 and 6, the engagement between the stops 25 and the cap sleeves 9 is canceled to allow the lifting disk 20 to slide integrally with the slide disk 15. After the work has been removed, the lifting table 20 is lowered back to be ready for mounting the next work to be welded on the jig table 19. Subsequently, it is carried to the welding robot R by the forward movement of the slide disk 15.

In the figures, the stop 25 is in the form of a U-shaped or horseshoe-shaped seat which opens at one end (rear end) in the direction of slide movement of the lifting disk 20 (see FIG. 11) and is fixed to the lower surface of the lifting disk 20 by a plurality of bolts 26. The numeral 27 denotes a receiving step formed on the inner wall surface of the U-shaped groove associated with the cap sleeve 9, which is adapted to be removably engaged with the stop flange 8 extending from the cap sleeve 9 of the piston rod 7. Thus, the lifting disk 20 can be positively and quickly lowered by the air cylinders 6, which means high operating efficiency. The cap sleeves 9 at the front ends of the piston rods 7 project to cut off the path of slide movement of the lifting disk 20 having the stops 25 and are correctly opposed to the positioning stops 25, as can be seen from the figures.

A pair of such welding jig apparatuses are arranged as a set around the welding robot R, as shown in FIG. 1, and during use, when one of the welding jig apparatuses is in the carried-in state (see FIGS. 5 and 6), relative to the welding robot R, of work clamped on the jig table 19, established by the forward movement of the slide disk 15 moving back and forth along the rails 2 on the installation stand 1, the other is in the carried-out state of work (see FIGS. 2 and 3); at the stop position in the former state the work is safely subjected to automatic welding, while at the stop position in the latter state the weld work is dismounted and preparations are made for mounting the next work to be welded. In dismounting, the lifting disk 20 is lifted, as shown in FIGS. 7–9, and in making preparations for the next welding, the lifting disk 20 is lowered back, as described previously.

In this case, the pair of welding jig apparatuses, as can be seen from FIG. 1, are adapted to alternately perform said actions to allow the welding robot R to work efficiently, but the number and disposition of welding jig apparatuses are not limited to the illustration. For example, a plurality of welding jig apparatuses may be disposed radially around the welding robot R. Since the welding robot R itself is not an object of the invention, it is shown only schematically, but actually it is of the articulation type having a degree of freedom of 5–6 and fixed on the workshop floor, and the so-called PTP system is used for its control. At any rate, the aforesaid operation of the jig apparatuses is, of course, electrically controlled so that it is automatically performed in operative association with automatic welding performed by the welding robot R, and to this end it is only necessary for the operator to push buttons on the control panel.

The mechanism for mounting and dismounting the jig table 19, mentioned previously, is installed as a set of two parts between the table 19 and the slide disk 15, as can be seen from FIGS. 1–8. That is, in FIGS. 12–21 showing it on an enlarged scale, the numeral 28 denotes a pawl disk fixed to the lower surface of the jig table 19 by a plurality of bolts 29, whose depending front end forms an outwardly extending circular flange pawl 30 whose circumferential surface is formed with a plurality of unlocking grooves 31. The grooves 31, in the case of the illustration, are two in number, disposed on a straight line in opposed relation to each other, but the number may be increased so long as they are disposed at equispaced positions. The numeral 32 denotes a large-diameter sleeve portion stepwise formed in the central opening in the pawl disk 28, in which a centering guide bushing 33 of hardened steel is fixedly fitted.

On the other hand, the numeral 34 denotes a pawl disk on the slide disk 15 opposed to said pawl disk 28, which is fixed to the upper surface of the slide disk 15 through an attachment seat disk 36 fixed to the lower surface of the pawl disk 34 by bolts 35. The numeral 37 denotes fixing bolts therefor. This pawl disk 34 is cylindrical and its upright front end is formed with a flange pawl 38 corresponding to the flange pawl 30 on the table 19, and a continuous circumferential groove 39 disposed immediately therebelow. In this case, as can be seen from the figures, said unlocking grooves 31 are not provided in the flange pawl 38 on the slide disk 15. The numeral 40 denotes a large-diameter sleeve portion stepwise formed in the central opening in the pawl disk 34, which serves as a spring storing chamber. The numeral 41 denotes a centering guide post of bearing steel force-fitted from below into the central opening in the pawl disk 41. The lower end of the post is closed by the attachment seat disk 36 and the upright upper end of the post 41 projects beyond the upper surface of the pawl disk 34, the projecting portion having fitted thereon a ball retainer 42 adapted to be removalby engaged with the centering guide bushing 33.

The race portion of the ball retainer 42 is made of synthetic resin, aluminum, copper, brass or other material and has steel balls 43 retained therein to make point contact with the aforesaid guide bushing 33. The numeral 44 denotes a coil spring for constantly applying an upward force to the ball retainer 42, the resilient force and direction of winding of said spring allowing upward and downward movements and rotation of the ball retainer 42, thereby ensuring smooth engagement with and disengagement from the pawl disk 28 associated with the table 19, while maintaining highly accurate contact with the guide bushing 33 after engagement. The spring 44 is sealed in the aforesaid spring storing chamber 40. The numeral 45 denotes a keep plate for preventing falling-off of the ball retainer 42, which is removably attached to the upper surface of the guide post 41 by a set-screw 46.

The numeral 47 denotes hook segments for engaging the pawl disk 28 on the jig table 19 and the pawl disk 34 on the slide disk 15 with each other and fixing them in position. They are made of hardened steel and have a size suited to the unlocking grooves 31. The segments 47 are U-shaped in cross-section and straddle the flange pawls 30 and 38 of the pawl disks 28 and 34, with their upper end hook portions 48 serving to prevent slipping-off of the flange pawl 30 on the table 19, their lower end hook portions 49 being fitted in the peripheral groove 39 of the pawl disk 34 on the slide disk 15.

The numeral 50 denotes a rotary ring for rotating the segments 47, which is attached to the segments 47 from the exterior thereof by bolts 51. The numeral 52 denotes segment receiving grooves formed in the inner peripheral surface of the rotary ring 50, and the segments 47 are received in said grooves 52 and thereby restrained. Thus, the unlocking grooves 31 formed in the pawl disk 28 on the table 19 are engageable with the segments 47. The numeral 53 denotes an operating handle extending from the rotary ring 50, which is rotated by the operator when mounting or dismounting the table 19 with respect to the slide disk 15. The numeral 54 denotes a positioning stop screw for preventing free rotation of the rotary ring 50 when the table 19 has been removed. The screw 54 holds a steel ball at its front end, which is urged by a coil spring 56 sealed therein. The stop screw 54 is threadedly installed in the rotary ring 50 to urge the ball 55 at its front end constantly against the flange pawl 38 of the pawl disk 34 associated with the slide disk 15, thus applying frictional resistance to free rotation of the rotary ring 50 to prevent the operating position of the operating handle 53 from changing incessantly.

FIGS. 12–15 show the locked state of the jig table 19 attached to the slide disk 15 on the installation stand 1. In this state, the hook segments 47 fitted and fixed in the rotary ring 50 are in disengaged, shifted relation to the unlocking grooves 31 of the pawl disk 28 associated with the table 19, so that the upper end hooks 48 of the segments 47 restrain the table 19 from being upwardly pulled out of the slide disk 15.

Figure 14:
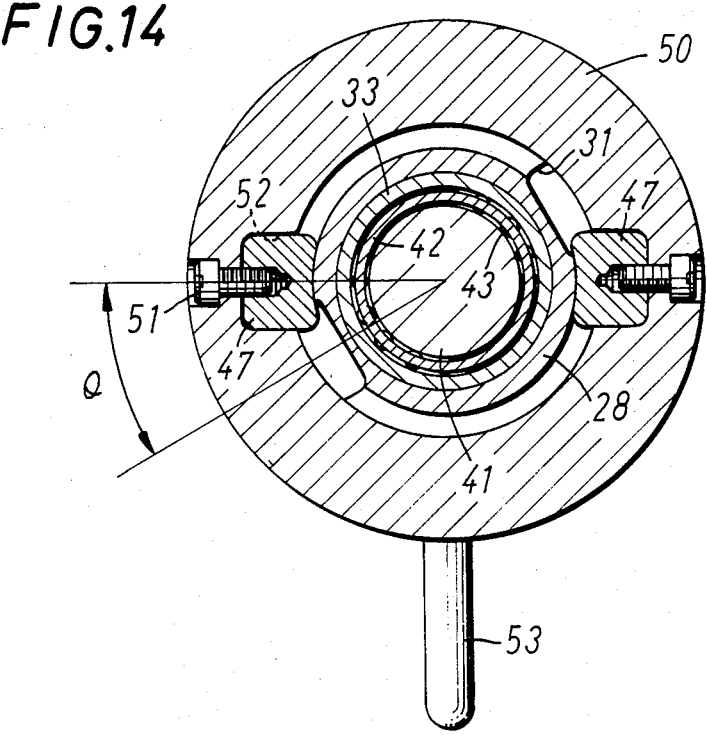
Figure 16:
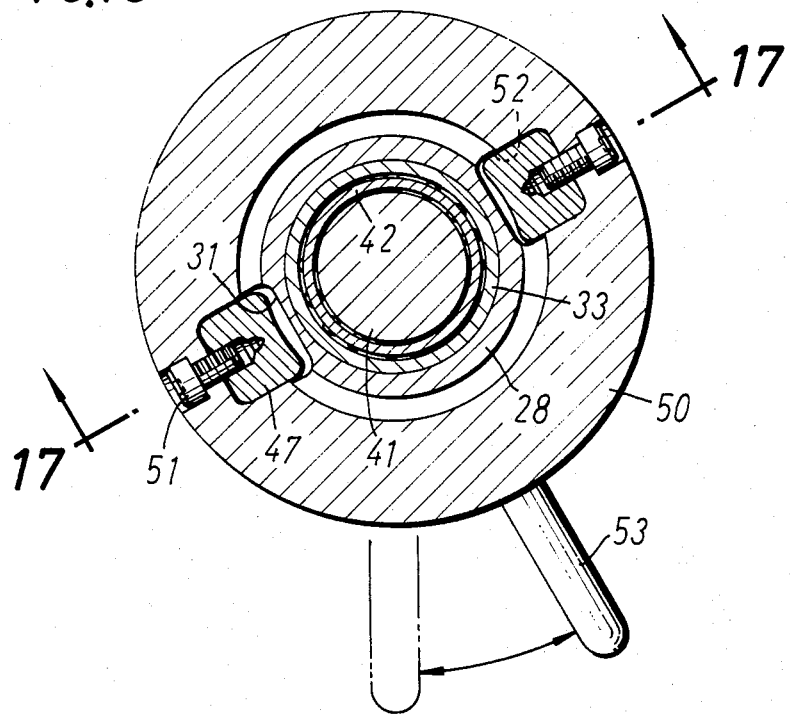
Figure 15:
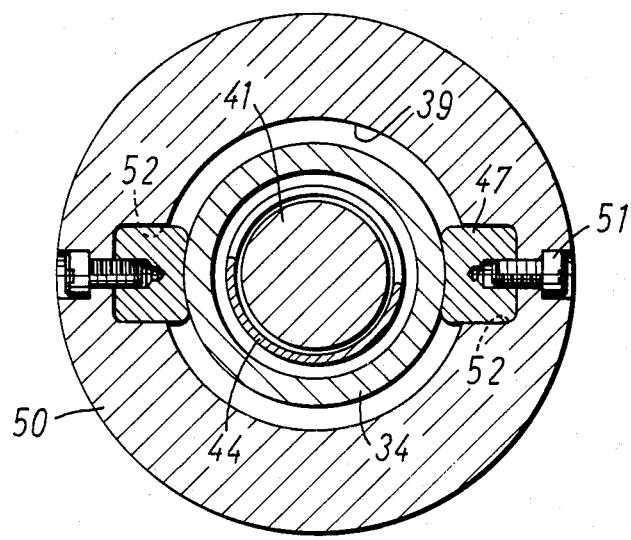
Figure 17:
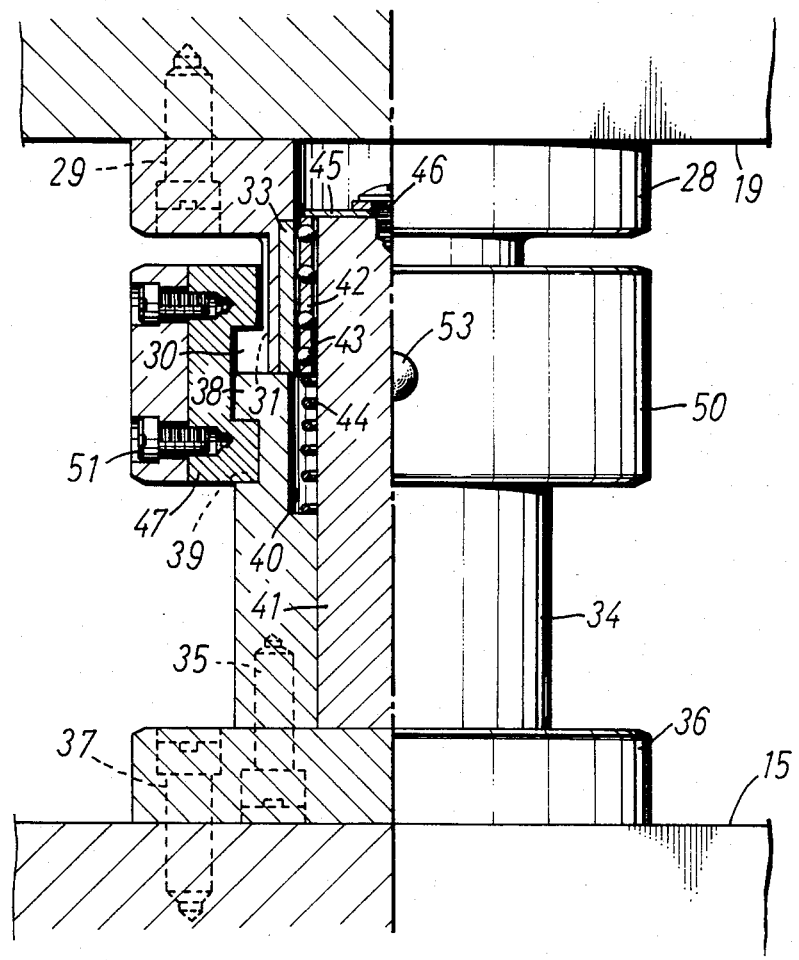
Figure 19:
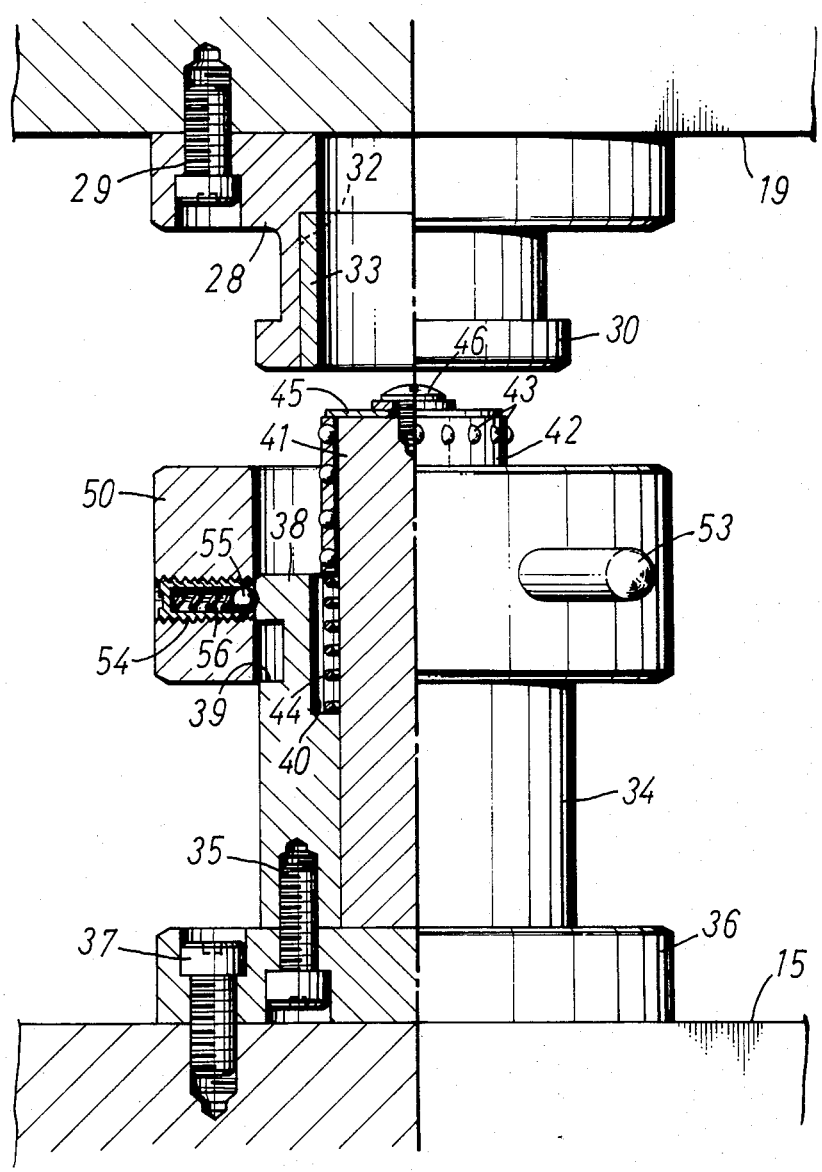
Figure 20:
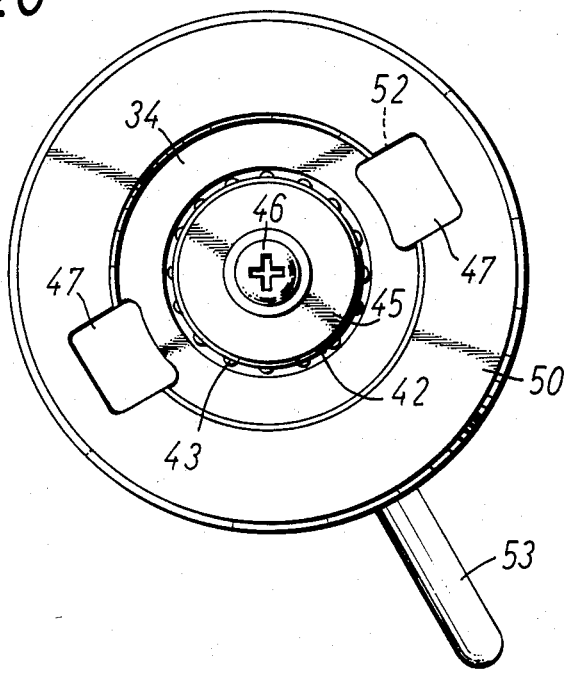
Figure 21:
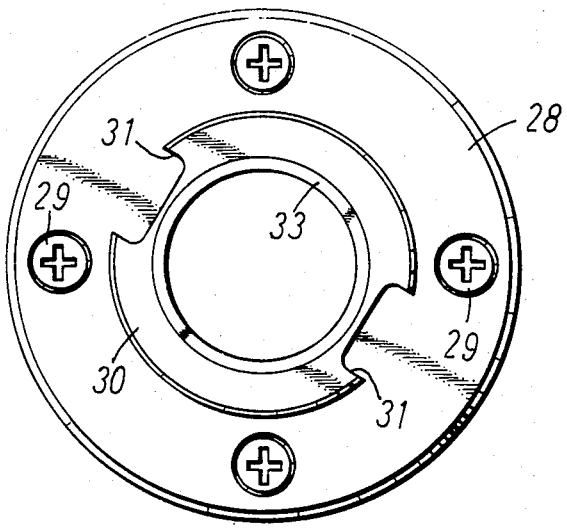

Then, when it is desired to remove the table 19 from the slide disk 15, for example, to exchange it for another one, this is achieved by turning the rotary ring 50 through a fixed angle of rotation θ by means of its handle 53 to align the hook segments 47 with the unlocking grooves 31 of the pawl disk 28, as shown in FIGS. 14 through 16. In so doing, the engagement between the upper end hooks 48 of the segments 47 and the flange pawl 30 of the pawl disk 28 is canceled, so that the table 19 can be pulled up along the guide post 41 until it is completely removed from the slide disk 15, as shown in FIGS. 19-21. FIG. 17 shows an intermediate step of the process. Reversely, the table 19 can, of course, be attached to the slide disk 15 by aligning the segments 47 with the unlocking grooves 31 of the pawl disk 28 and pushing the pawl disk 28 down along the guide post 41.

At any rate, the pawl disk 28 assocaited with the table 19 is removably fitted on the centering guide post 41 on the slide disk 15 through point contact between the centering guide bushing 33 fitted in the central opening in the pawl disk 28 and the balls 43 in the rotatable ball retainer 42 fitted on the guide post 41. Further, since the retainer 42 is subjected to an upward force exerted by the coil spring 44, the lifting and lowering of the retainer 42 and the free rotation of the balls 43 can be made smooth and hence thanks to such movements the mounting and dismounting of the table 19 can be effected lightly and efficiently in a so-called at-a-touch operation. Further, besides this excellent operability, once the table 19 is mounted, the ball retainer 42 on the centering guide post 41 and the centering guide bushing 33 are kept in a mutually closely fitted state, so that accurate positioning and the completely locked state of the table 19 due to the segments 47 can be attained. Contributing to attainment of such effect is the fact that the guide bushing 33, guide post 41 and ball retainer 42 are parts which can be easily finished to high quality.

Figure 18:
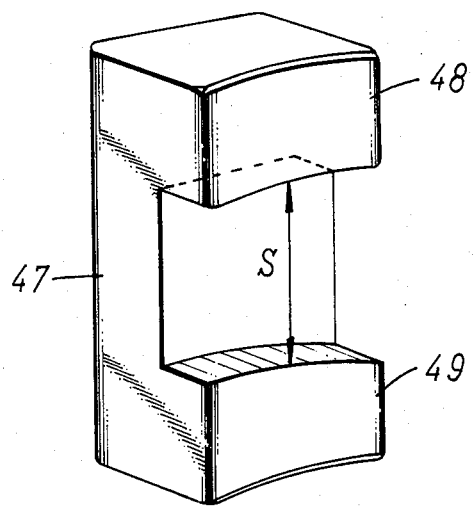

As can be seen from the enlarged view in FIG. 18, it is preferable that the width S of the opening defined between the upper and lower end hooks 48 and 49 of the hook segment 47 of U-shaped cross-section be such that the opening is gradually narrowed as the rotary ring 50 is rotated in one direction, so that the rotation of the operating handle 53 in one direction is in the locking direction of the table 19, while the rotation of the handle in the opposite direction is in the unlocking direction of the table 19, thus giving operational indication or guidance to the operator. According to the degree of the taper angle of the opening, the angle of rotation θ of the operating handle 53 can, of course, be determined so that it has an optimum value.

Figure 22:
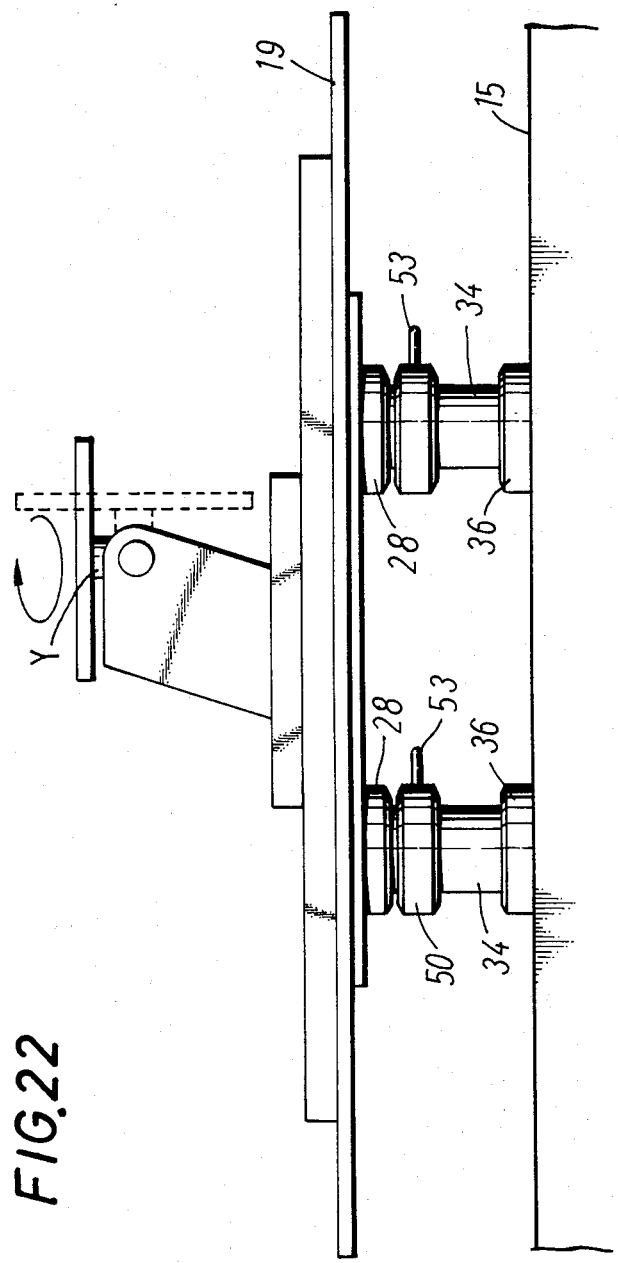
FIGS. 22 and 23 are schematic side views of exchange jig tables.
Figure 23:
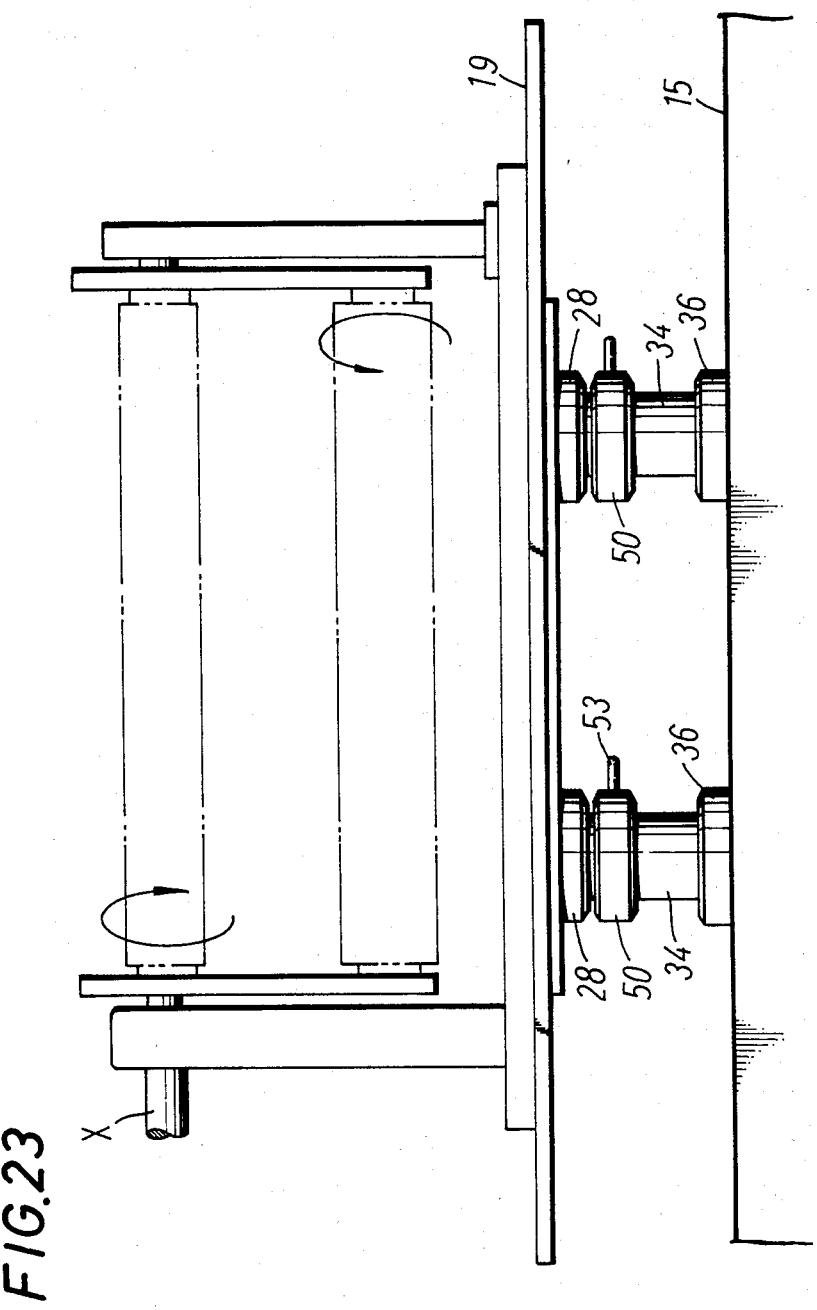

While the jig table 19 has been shown in the form of a simple flat plate for the sake of convenience of explaining it by way of example, and it has been suggested that work clamped by welding jigs is welded by the robot R with said work remaining fixed to the table surface, it is possible to use other types of tables 19, e.g., one schematically shown in FIG. 22, which has a mechanism for rotating work around a vertical axis Y during welding, another shown in FIG. 23, which has a mechanism for rotating work around a horizontal axis X during welding, another, not show, which has a mechanism for sliding work in horizontal and vertical directions during welding, and another having a mechanism which suitably combines these movements, to cope with changes in the type of work; thus, the aforesaid table mounting and dismounting mechanism can be used more effectively to provide for convenient use.

Figure 24:
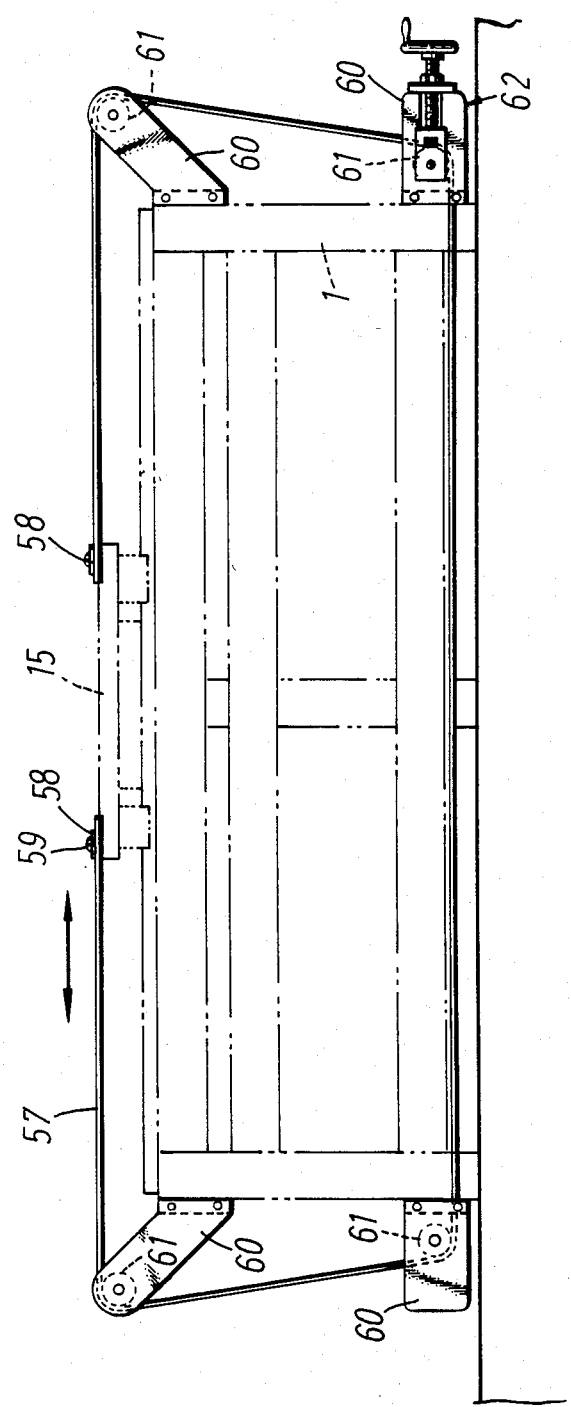
FIG. 24 is a complete schematic side view, showing a cover belt attached to a jig apparatus.
Figure 25:
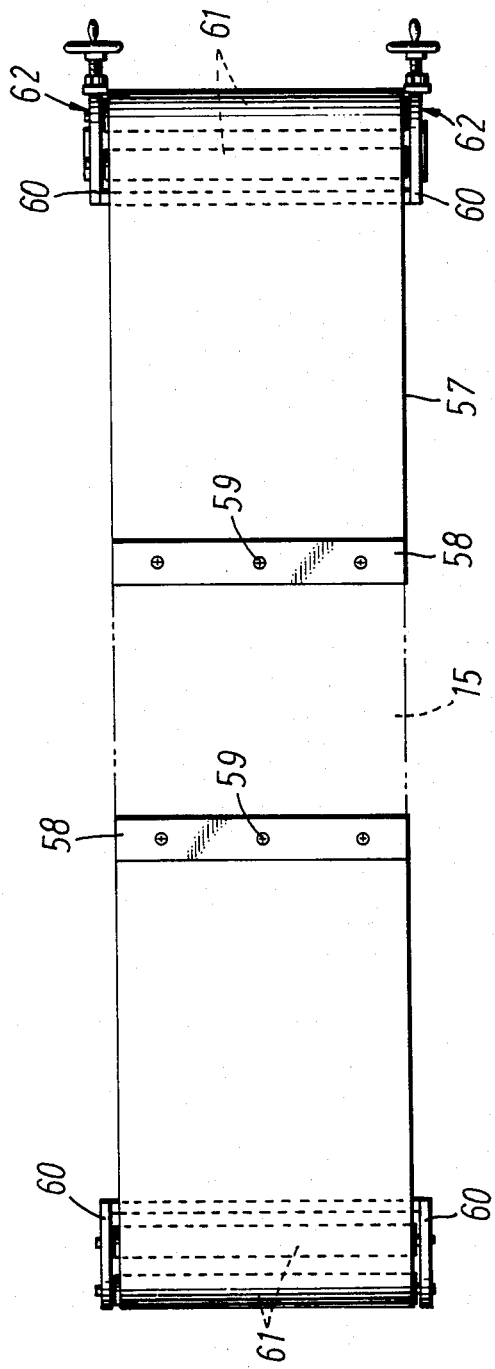
FIG. 25 is a schematic plan view of the cover belt.

In view of the danger that sparks, falling dregs and slag which are produced during welding contaminate the installation stand 1 of the welding jig apparatus, especially the slide guide rails 2 and guide shafts 5 which are exposed on the upper surface of the stand, and thereby interfere with smooth back-and-forth movement of the slide disk 15 and decrease the duarability of the apparatus itself, it is preferable that as shown in FIGS. 24 and 25, at least the upper surface of the stand 1 be covered with a cover belt 57 which is capable of moving back and forth with the slide disk 15. In these figures, the entire peripheral surface of the stand 1, including its front and rear and upper and lower surfaces is covered with the substantially endless cover belt 57 made of synthetic rubber which is superior in heat resistance and abrasion resistance. The belt 57 is removably attached at its cut-off ends to the upper surface of the slide disk 15 by keep plates 58 and bolts 59 so that it is movable integrally with the slide disk. Thus, the belt has no danger of causing trouble to or imposing restrictions on the movement of the lifting disk 20 and jig table 19 disposed thereabove. The numeral 60 denotes a plurality of roller support brackets fixed to the front and rear surfaces of the stand 1. The belt 57 is entrained around a plurality of rollers 61 horizontally supported by said roller support brackets 60 and is adapted to be tensioned to a suitable degree by handle operation on a tensioning mechanism 62 affixed to a roller support bracket 60. In not only welding operation but also printing, soldering, fusion-cutting and press-work performed by robots, such problems would occur as contamination due to adhesion and deposition of painting material and dregs. Thus, said cover belt 57 may be used in the same manner in these fields and applications. In addition, in the illustrated embodiment the present invention is embodied in a welding jig apparatus serving as peripheral equipment for a welding robot, but it is also possible to apply the invention to a jig apparatus for carrying in and out work with respect to a painting robot, processing robot, soldering robot or other industrial robot; it should be noted that these applications come under the scope of the present invention.

As has been described so far, the present invention provides a jig apparatus which is used to carry in and out work with respect to an industrial robot fixedly installed on a workshop floor and which is arranged so that its jig table for clamping work can be mounted and dismounted and exchanged for another one to accommodate a wide variety of work. Thus, it can be conveniently used particularly by small and medium-sized enterprises receiving orders from large enterprises, and its necessary mechanisms are simplified. Thus, it is possible to make full use of industrial robots while introducing the present jig apparatus at a low price.

What is claimed is:

1. A jig apparatus for use with industrial robots, comprising a jig table (19) for clamping work, and a slide disk (15) adapted to be slid back and forth along guide rails (2) laid on an installation stand (1) placed on a workshop floor, wherein in order to assemble said jig table (19) from above to said slide disk (15) so that they can be integrally moved back and forth, a pawl disk (34) fixed to the upper surface of said slide disk (15) and a second pawl disk (28) fixed to the lower surface of said jig table (19) in opposed relation to said first pawl disk are removably engaged with each other by means of turnable hook segments (47) fitted on the outer peripheral surfaces of said two disks (28, 34), while a centering guide post (41) fixedly erected on the center of the pawl disk (34) on the slide table (15) is removably fitted in the central opening in the pawl disk (28) on the jig table (19) through point contact between balls (43) in a ball retainer (42) fitted on the guide post and a centering guide bushing (33) fitted in the central opening, said ball retainer (42) being constantly subjected to an upward resilient force.

* * * * *